US012748697B2

(12) United States Patent
Yang et al.

(10) Patent No.: US 12,748,697 B2
(45) Date of Patent: Sep. 29, 2026

(54) COLLISION PROCESSING METHOD AND APPARATUS FOR VIRTUAL OBJECT, AND ELECTRONIC DEVICE AND STORAGE MEDIUM

(71) Applicant: Beijing Zitiao Network Technology Co., Ltd., Beijing (CN)

(72) Inventors: Xuefeng Yang, Beijing (CN); Yi Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 190 days.

(21) Appl. No.: 18/551,903

(22) PCT Filed: Mar. 21, 2022

(86) PCT No.: PCT/CN2022/081961
§ 371 (c)(1),
(2) Date: Sep. 22, 2023

(87) PCT Pub. No.: WO2022/218104
PCT Pub. Date: Oct. 20, 2022

(65) Prior Publication Data
US 2024/0220406 A1 Jul. 4, 2024

(30) Foreign Application Priority Data
Apr. 15, 2021 (CN) ......................... 202110407859.4

(51) Int. Cl.
*G06F 12/06* (2006.01)
*G06T 13/40* (2011.01)
*G06T 19/00* (2011.01)

(52) U.S. Cl.
CPC .......... *G06F 12/0676* (2013.01); *G06T 13/40* (2013.01); *G06T 19/00* (2013.01); *G06T 2210/21* (2013.01)

(58) Field of Classification Search
CPC ..... G06F 12/0676; G06T 13/40; G06T 19/00; G06T 2210/21
See application file for complete search history.

(56) References Cited

U.S. PATENT DOCUMENTS 6,208,360 B1 * 3/2001 Doi ......................... G06T 13/80 345/473
6,417,854 B1 * 7/2002 Isowaki ................. A63F 13/57 345/473
(Continued)

FOREIGN PATENT DOCUMENTS

CN 102662472 A 9/2012
CN 108629121 A 10/2018
(Continued)

OTHER PUBLICATIONS

International Search Report and Written Opinion for International Application No. PCT/CN2022/081961, mailed Jun. 8, 2022, 14 Pages.
(Continued)

*Primary Examiner* — Abderrahim Merouan

(57) ABSTRACT

This disclosure discloses a method and an apparatus for processing collision of virtual object, an electronic device, and a storage medium. The method for processing collision of a virtual object includes: in response to a collision occurring to the virtual object, determining a first node of the virtual object and one or more second nodes of the virtual object, the collision occurring to the first node, and each second node of the one or more second nodes being directly or indirectly connected with the first node; determining a first target position of the first node according to a force applied to the first node during the collision; determining a second target position of the first node and a second target position of the each second node according to the first target position; and adjusting a posture of the virtual object in a
(Continued)

user interface according to the second target position of the first node and the second target position of the each second node.

18 Claims, 10 Drawing Sheets

(56) References Cited

U.S. PATENT DOCUMENTS

| | | | | |
|---|---|---|---|---|
| 6,714,901 | B1 * | 3/2004 | Cotin | B25J 9/1689 703/11 |
| 2010/0251185 | A1 * | 9/2010 | Pattenden | A63F 13/52 715/849 |
| 2016/0307354 | A1 | 10/2016 | Baur | |
| 2017/0221250 | A1 | 8/2017 | Aguado et al. | |

FOREIGN PATENT DOCUMENTS

| | | | |
|---|---|---|---|
| CN | 110180182 | A | 8/2019 |
| CN | 111260762 | A | 6/2020 |
| CN | 111773690 | A | 10/2020 |
| CN | 111773723 | A | 10/2020 |
| CN | 111968204 | A | 11/2020 |
| CN | 112001989 | A | 11/2020 |
| CN | 112121417 | A | 12/2020 |
| WO | 2020/070928 | A1 | 4/2020 |
| WO | 2020/084662 | A1 | 4/2020 |

OTHER PUBLICATIONS

Office action received from Chinese patent application No. 202110407859.4 mailed on Mar. 3, 2026, 20 pages (10 pages English Translation and 10 pages Original Copy).

* cited by examiner

COLLISION PROCESSING METHOD AND APPARATUS FOR VIRTUAL OBJECT, AND ELECTRONIC DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/CN2022/081961, filed on Mar. 21, 2022, which is based on and claims priority of Chinese application for invention No. 202110407859.4, filed on Apr. 15, 2021, the disclosure of which is hereby incorporated into this disclosure by reference in its entirety.

TECHNICAL FIELD

The present disclosure relates to the field of information technologies, and in particular, to a method and an apparatus for processing collision of virtual object, an electronic device, and a storage medium.

BACKGROUND

With the continuous development of information technology, intelligent terminals can be used not only for communication, but also for displaying multimedia information, such as video information, image information, and the like.

For example, the smart terminal may display a user interface such as a game interface, a three-dimensional (3-D) application interface, and the like. Virtual objects, such as virtual characters, virtual items, and the like, may appear in these user interfaces. Also in some scenarios the virtual objects may also be moving, resulting in possible collisions between different virtual objects.

A virtual object is currently driven to move using a skeletal animation, in which the virtual object has a skeletal structure comprising interconnected bones, and the joints between adjacent bones may be considered as nodes.

SUMMARY

The embodiments of the present disclosure provide a method for collision processing of a virtual object, comprising:

in response to a collision occurring to the virtual object, determining a first node of the virtual object and one or more second nodes of the virtual object, the collision occurring to the first node, and each second node of the one or more second nodes being directly or indirectly connected with the first node;

determining a first target position of the first node according to a force applied to the first node during the collision;

determining a second target position of the first node and a second target position of the each second node according to the first target position; and adjusting a posture of the virtual object in a user interface according to the second target position of the first node and the second target position of the each second node.

The embodiments of the present disclosure further provide a collision processing apparatus for a virtual object, comprising:

a first determining module configured to, in response to a collision occurring to the virtual object, determine a first node of the virtual object and one or more second nodes of the virtual object, the collision occurring to the first node, and each second node of the one or more second nodes being directly or indirectly connected with the first node;

a second determining module configured to determine a first target position of the first node according to a force applied to the first node during the collision;

a third determining module configured to determine a second target position of the first node and a second target position of the each second node according to the first target position; and an adjusting module configured to adjust a posture of the virtual object in a user interface according to the second target position of the first node and the second target position of the each second node.

The embodiments of the present disclosure further provides an electronic device, comprising:

one or more processors; and a memory device for storing one or more programs, wherein the one or more programs, when executed by the one or more processors, cause the one or more processors to implement the collision processing method of the virtual object as described above.

The embodiments of the present disclosure also provide a non-transitory computer-readable storage medium storing a computer program which, when executed by a processor, implements the collision processing method of the virtual object as described above.

The embodiments of the present disclosure further provide a computer program, comprising: instructions which, when executed by a processor, implement the collision processing method of the virtual object as described above.

The embodiments of the present disclosure also provide a computer program product comprising a computer program or instructions which, when executed by a processor, implement the collision processing method of the virtual object as described above.

BRIEF DESCRIPTION OF THE DRAWINGS

The above and other features, advantages, and aspects of the embodiments of the present disclosure will become more apparent by referring to the following detailed embodiments when taken in conjunction with the accompanying drawings. Throughout the drawings, the same or similar reference signs refer to the same or similar elements. It should be understood that the drawings are schematic and that the elements and components are not necessarily drawn to scale.

DETAILED DESCRIPTION

Figure 1:
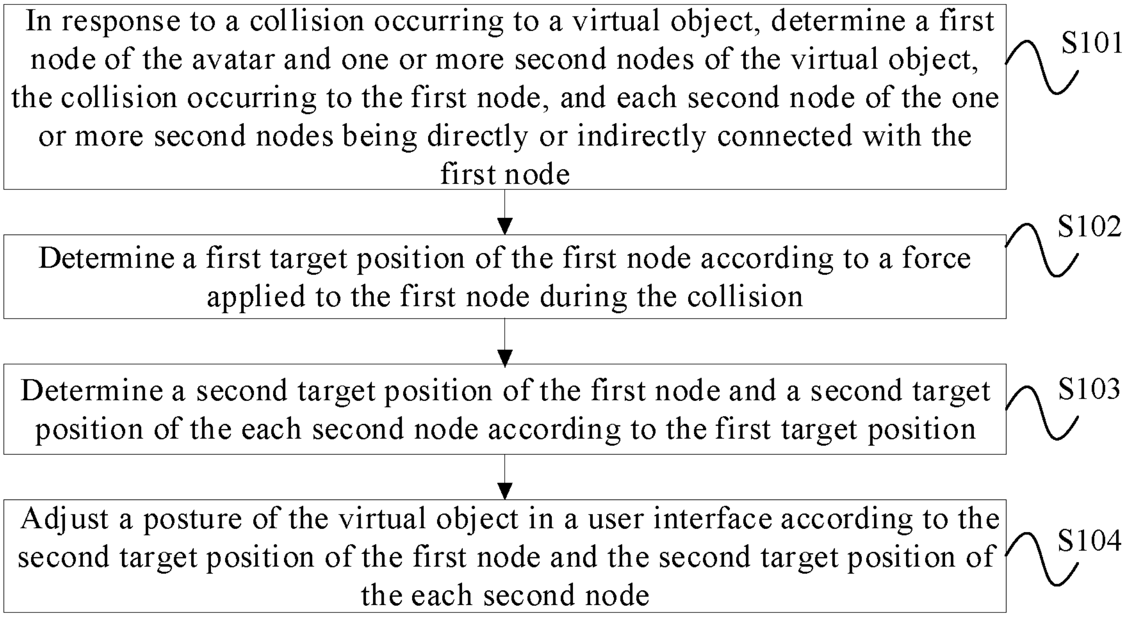
FIG. 1 is a flow chart of a collision processing method of a virtual object in an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather are provided for a more complete and thorough understanding of the present disclosure. It should be understood that the drawings and the embodiments of the disclosure are for illustration purposes only and are not intended to limit the scope of the disclosure.

It should be understood that the various steps recited in the embodiments of the method of the present disclosure may be performed in a different order, and/or performed in parallel. Moreover, method embodiments may include additional steps and/or omit performing the illustrated steps. The scope of the present disclosure is not limited in this respect.

The term "comprise" and variations thereof as used herein are intended to be open-ended, i.e., "comprising but not limited to". The term "based on" means "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that the modifiers like "one" or "more" in this disclosure are intended to be illustrative rather than limiting, and that those skilled in the art will appreciate that they refer to "one or more" unless the context clearly indicates otherwise.

The names of messages or information exchanged between devices in the embodiments of the present disclosure are for illustrative purposes only, and are not intended to limit the scope of the messages or information.

After a collision occurs to a virtual object, a change of a position of a node cannot be displayed more realistically, which reduces sense of reality of the pictures. In order to solve the above technical problem or at least partially solve the above technical problem, embodiments of the present disclosure provide a method and an apparatus for processing collision of a virtual object, an electronic device and a storage medium, which, when collision occurs at a joint point of the virtual object, not only cause a change in position of the collided joint point, but also cause a change in position of other joint points directly or indirectly connected to the joint. Therefore, the position change of each joint point when collision occurs can be displayed more realistically, and the sense of reality of pictures is improved.

FIG. 1 is a flow chart of a collision processing method of a virtual object in an embodiment of the present disclosure. The present embodiment is applicable to a case where collision processing of a virtual object is performed in a client, and the method may be performed by a collision processing apparatus of a virtual object. The apparatus can be implemented in form of software and/or hardware. The apparatus can be configured in an electronic device, such as a terminal, specifically comprising but not limited to a smart phone, a handheld computer, a tablet computer, a wearable equipment with a display screen, a desktop computer, a notebook computer, an all-in-one machine, a smart home device, and the like. Alternatively, the present embodiment may be applied to a case where collision processing of a virtual object is performed in a server side, and the method may be performed by a collision processing apparatus of a virtual object. The apparatus may be implemented in form of software and/or hardware, and may be configured in an electronic device, such as a server.

As shown in FIG. 1, the method may specifically comprise steps S101-S104.

In S101, in response to a collision occurring to a virtual object, a first node of the virtual object and one or more second nodes of the virtual object are determined, wherein the collision occurs to the first node, and each second node of the one or more second nodes is directly or indirectly connected with the first node.

Figure 2:
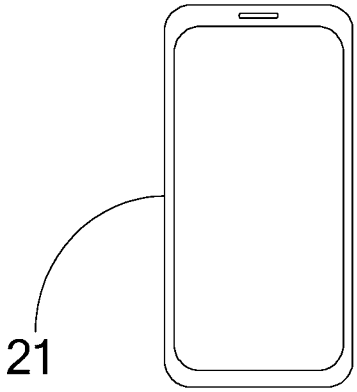
FIG. 2 is a schematic diagram of an application scenario in an embodiment of the present disclosure.
Figure 3:
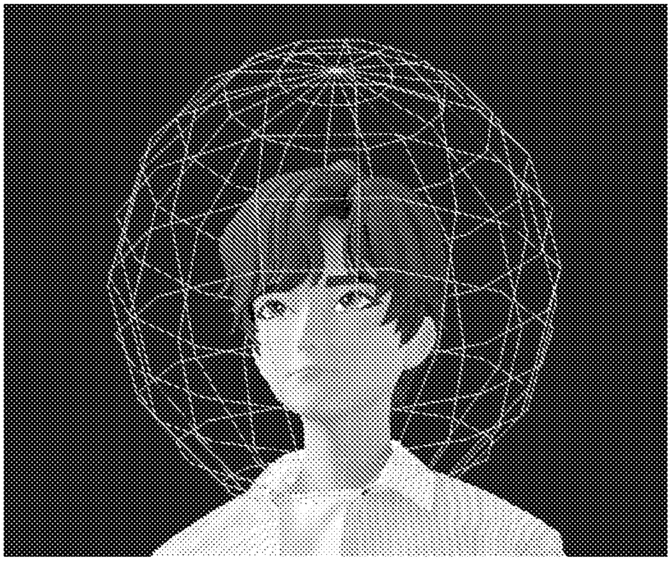
FIG. 3 is a schematic diagram of a virtual character in an embodiment of the present disclosure.
Figure 4:
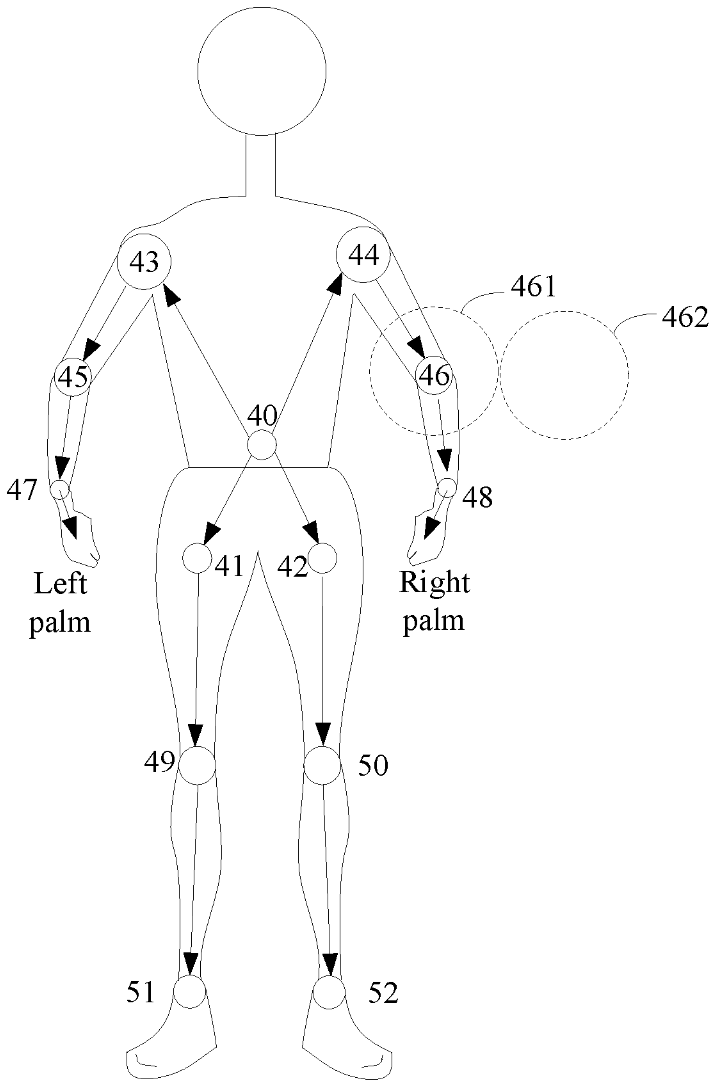
FIG. 4 is a schematic diagram illustrating a tree structure corresponding to a virtual character according to an embodiment of the present disclosure.

As shown in FIG. 2, a virtual object, for example, a virtual character, a virtual object, or the like, may be displayed in a user interface of a terminal 21. Taking a virtual character as an example. FIG. 3 is a schematic diagram of a virtual character. In this embodiment, bounding spheres of proper size are added to limb joint which is possibly collided in the virtual character and to other physical entities in the virtual scene. In some embodiments, the bounding spheres are not limited to enclosing a joint of a limb, but may also enclose, for example, a part of a limb, such as a lower arm, an upper arm, a lower leg, a thigh, and the like. The limb joint may also be referred to as a joint point. Other physical entities are not specifically limited, and may be, for example, another virtual character or another virtual object. In particular, the size of the bounding sphere is determined by the physical size of the limb joint or other physical entity itself, thereby enabling the bounding spheres to completely enclose the limb joint or other physical entities. In addition, the virtual character may correspond to a tree structure of a skeleton. As shown in FIG. 4, which is a schematic diagram of a tree structure, the joints of the limbs of the virtual character may be nodes in the tree structure. The palm, the foot, and the head of the virtual character may be nodes in the tree structure.

As shown in FIG. 4, 40 is a point in the waist of a virtual character, which may be a root node of the tree structure, and directions of arrows shown in FIG. 4 are directions from parent nodes to child nodes in the tree structure. For example, nodes directly connected to the root node 40 comprise node 41, node 42, node 43, and node 44. As shown in FIG. 4, node 43 is a parent node of node 45, and node 45 is a child node of node 43. Node 45 is a parent node of node 47, and node 47 is a child node of node 45. Node 47 is a parent node of the left palm, and the left palm is a child node of node 47. Relationships between other parent nodes and other child nodes are not described in detail herein. It is understood that the tree structure shown in FIG. 4 is only an illustrative example and is not limited in particular. For example, in other embodiments, the head may be used as a root node, and the parent node and the child node may be further divided in a sequence from the head to the foot. In addition, during movement of the virtual character, motion of the parent node is transmitted to the child node according to the tree structure of the skeleton.

Optionally, each node in the tree structure corresponding to the virtual object corresponds to a first bounding sphere respectively; and it is determined a collision occurs to the virtual object in response to the first bounding sphere colliding with a second bounding sphere of another physical entity in the virtual scene.

Mold penetration refers to mutual penetration or superposition between virtual objects or characters due to a mistake in setting a collision volume and the like. In order to ensure that the limb joints do not penetrate the other physical entities in the virtual scene during the simulated motion, a bounding box or bounding sphere with a simple shape is used in the present embodiment to enclose the entity which may cross the model. As shown in FIG. 4, each node in the tree structure corresponding to the virtual character may correspond to a bounding sphere which may be recorded as a first bounding sphere. The bounding sphere surrounds the node at the periphery thereof, and a center of the bounding sphere may be the node. For example, 461 is the first bounding sphere surrounding the node 46. In response to the first bounding sphere of the virtual character colliding with a second bounding sphere of another physical entity in the virtual scene, it is determined that the virtual object has collided with the other physical entity in the virtual scene. In addition, in other embodiments, in response to another physical entity or local nodes of another entity appearing in the first bounding sphere, it may also be determined that the virtual object has collided with the another entity in the virtual scene. That is, if there is another physical entity or part of another physical entity entering the first bounding sphere, it is determined that the virtual character and the other physical entity in the virtual scene have collided.

When collision occurs to the virtual character, a first node of the virtual character at which the collision occurs may be further determined, for example, in response to the first bounding sphere 461 colliding with the second bounding sphere 462 of another physical entity, it may be determined that the collision occurs to the node 46, and node 46 may be marked as the first node. Further, one or more nodes of the virtual character that are directly or indirectly connected to node 46 may be determined from node 46. For example, node 44 and node 48 are nodes directly connected to node 46, and node 40 and the right palm are nodes indirectly connected to node 46. Here, node 40, node 44, node 48, and the right palm may be respectively referred to as second nodes.

In S102, a first target position of the first node is determined according to a force applied to the first node during the collision.

For example, in response to a collision occurring at node 46, a first target position of node 46, which may be an ideal position of node 46 after the collision, may be determined based on the force applied to node 46 during the collision.

Optionally, the force applied to the first node in the collision process is a force applied to the first bounding sphere corresponding to the first node in the collision process.

The physical collision effect of the bounding sphere can be taken as the collision effect of the node in this embodiment. The physical collision may simulate newton's third law, for example, in the case that the first bounding sphere 461 collides with the second bounding sphere 462 of another physical entity, the first bounding sphere 461 and the second bounding sphere 462 may give each other a force with equal magnitude and opposition directions, which acts on the same straight line, at the position where the collision occurs. This force is the force applied to first and second bounding spheres 461 and 462, respectively, during the collision, and likewise, it's also the force applied to node 46 during the collision. Further, the ideal position of node 46 after the collision, i.e., the first target position, is determined based on the force applied to node 46 during the collision.

It will be appreciated that in other embodiments, the force applied to the node where collision occurs may be calculated directly from newton's third law, without the aid of a bounding sphere.

In S103, a second target position of the first node and a second target position of the each second node are determined according to the first target position.

Since node 40, node 44, node 48, and the right palm are each directly or indirectly connected to node 46, in response to a collision occurring at node 46, a position or an angle of node 46 may change, which in turn causes changes in positions or angles of node 40, node 44, node 48, and the right palm.

For example, a second target position of node 46 and second target positions of node 40, node 44, node 48 and the right palm are determined based on the first target position, respectively. The second target position of node 46 may be an actual position of node 46 after the collision occurs at node 46, and the second target positions of node 40, node 44, node 48, and the right palm, respectively, may be actual positions corresponding to node 40, node 44, node 48, and the right palm, respectively, after the collision occurs at node 46.

In S104, a posture of the virtual object in a user interface is adjusted according to the second target position of the first node and the second target position of the each second node.

Further, a posture of the virtual character in the user interface may be adjusted based on the second target position of node 46 and the second target positions of node 40, node 44, node 48, and the right palm, respectively. For example, a right arm of the virtual character may bend.

In the collision processing method of virtual object provided by the embodiment of the disclosure, when the collision occurs to the virtual object, the first node in the virtual object, where the collision occurred, and the one or more second nodes which are directly or indirectly connected with the first node, are determined. Further, the first target position of the first node is determined according to the force applied on the first node during the collision, and a second target position of the first node and a second target position of the each second node are determined according to the first target position. Thereby the posture of the virtual object in the user interface is adjusted based on the second target position of the first node and the second target position of the each second node. In response to a collision occurring to a joint point of the virtual object, not only the joint point where the collision occurs is changed in position, but also other joint points directly or indirectly connected to the joint point are caused to change in position. Therefore, the position change of each joint point when collision occurs can be displayed more realistically, and the sense of reality of pictures is improved.

On the basis of the foregoing embodiment, the determining the second target position of the first node and the second target position of the each second node according to the first target position comprises: determining the second target position of the first node and the second target position of the each second node according to the first target position and a first original position of a first reference node in the one or more second nodes before the collision occurs, wherein the second target position of the first reference node is the first original position.

Figure 5:
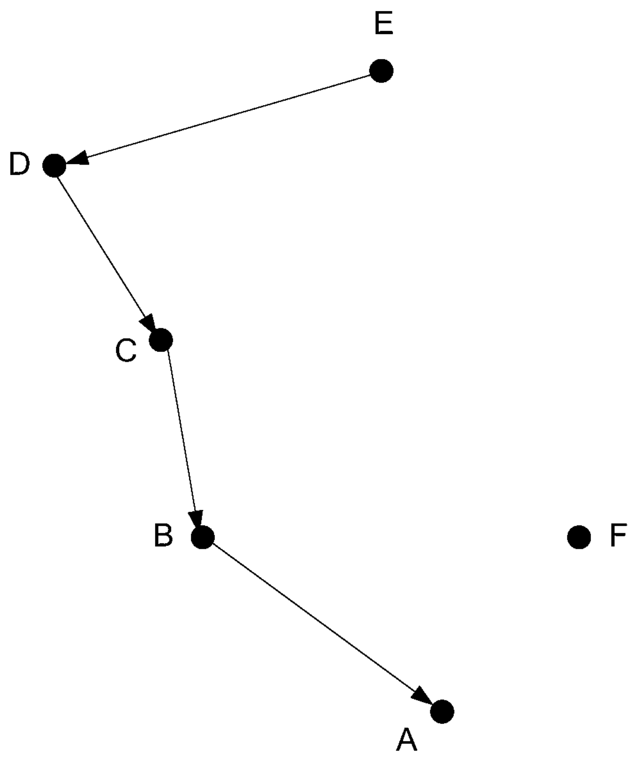
FIG. 5 is a schematic diagram of a node in an embodiment of the present disclosure.

As shown in FIG. 5, node A, node B, node C, node D, and node E are nodes in a tree structure corresponding to a virtual character, respectively, wherein an arrow direction is a direction from a parent node to a child node. For example, node A may be the left hand palm as shown in FIG. 4, node B may be node 47 as shown in FIG. 4, node C may be node 45 as shown in FIG. 4, node D may be node 43 as shown in FIG. 4, and node E may be node 40 as shown in FIG. 4.

For example, in response to a collision occurring at node A, node A may act as the first node. Further, a first target position of node A may be determined according to a force applied to node A during the collision, wherein the first target position may be a position of point F shown in FIG. 5. In this embodiment, when a collision occurs to the virtual character, a position of the virtual character may not be changed as a whole, but positions of local nodes of the virtual character may be changed. In this case, the node E shown in FIG. 5 may be taken as a first reference node whose position before and after the collision remains unchanged. Each of node B, node C, node D and node E is a second node connected directly or indirectly to node A. In this embodiment, the specific number of second nodes is not limited, and for example, the number of second nodes subjected to iteration may be set in advance to be N. Taking N=4 as an example, when a collision occurs at the node A, 4 nodes, for example, node B, node C, node D and node E, may be sequentially selected as the second nodes from the node A to a direction of the root node of the tree structure. It is understood that the value of N can be determined according to the effect of collision. If the effect of collision involves the whole arm, N may be equal to 3, that is, node B, node C, and node D may be selected as the second nodes and the node D may be selected as the first reference node. If the collision effect involves the whole body, N may be equal to 4.

Taking N=4 as an example, a position of a first reference node, i.e., node E, before the collision occurs is denoted as a first original position. Specifically, second target positions, that is, actual positions after the collision, corresponding to node A, node B, node C, node D, and node E may be calculated according to the position of point F, i.e., the first target position of the node A and the first original position of the node E before the collision occurs. The second target position of node E is still the first origin position, since the position of the first reference node before and after the collision remains unchanged. In addition, in the present embodiment, the position of point F and the first original position of node E before the collision occurs may be fixed.

Figure 6:
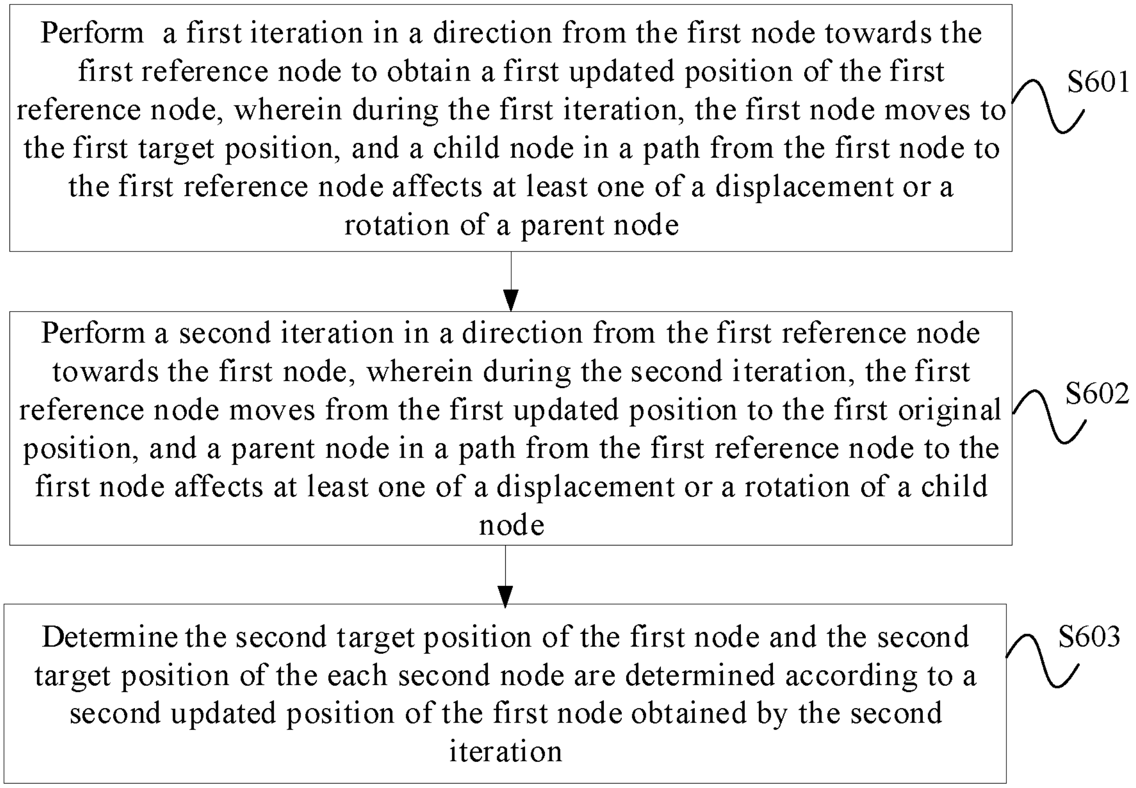
FIG. 6 is another flow chart of a collision processing method of a virtual object in an embodiment of the present disclosure.

Optionally, the second target position of the first node and the second target position of the each second node are determined according to the first target position and the first original position of the first reference node in the one or more second nodes before the collision occurs, which comprises steps S601 to S603 shown in FIG. 6.

In S601, a first iteration is performed in a direction from the first node towards the first reference node to obtain a first updated position of the first reference node, wherein during the first iteration, the first node moves to the first target position, and a child node in a path from the first node to the first reference node affects at least one of a displacement or a rotation of a parent node.

Figure 7:
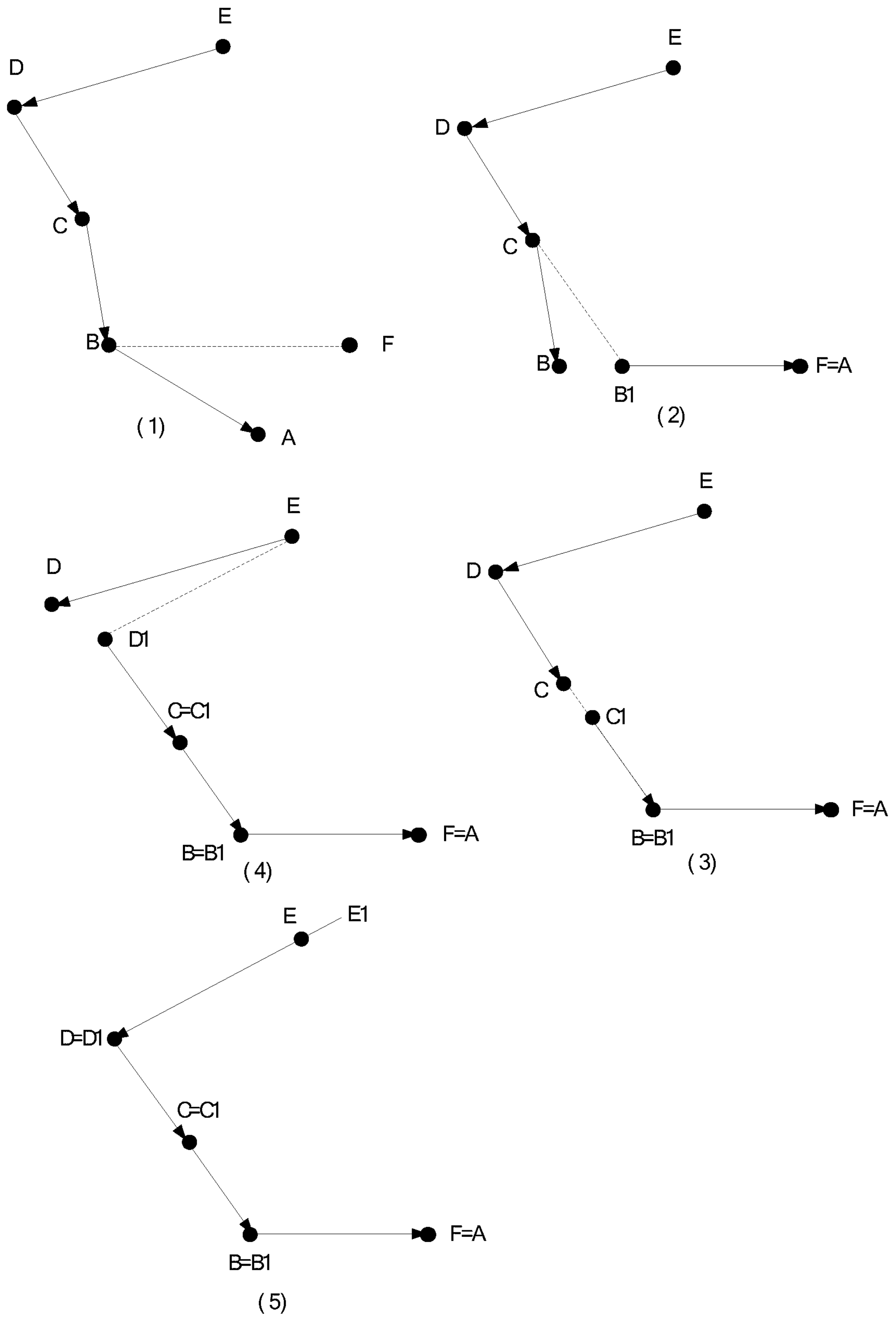
FIG. 7 is a schematic diagram of a first iteration in an embodiment of the present disclosure.

As shown in FIG. 7, an iteration is performed in a direction from node A to node E, and this iterative process is denoted as the first iteration. During the first iteration, a connection line between node A and node B needs to be moved first, so that node A moves to point F. Specifically, point F may be used as a target end point of the connection line between node A and node B, and since a starting point of the connection line is node B, point F and node B may be connected to obtain the connection line between point F and node B shown in FIG. 7, specifically shown as (1) in FIG. 7. Further, the connection line between node A and node B is moved to the connection line between point F and node B. Moreover, node A and point F are made to coincide, so that an updated position B1 of the node B appears, as shown in (2) of FIG. 7.

Further, a connection line between node B and node C needs to be moved so that node B moves to B1. Specifically, B1 is used as a target end point of the connection line between node B and node C, and B1 is connected to a start point of the connection line, i.e., node C, as shown in (2) of FIG. 7. The connection line between node B and node C is moved to the connection line between B1 and node C, and node B and B1 are made to coincide, so that an updated position C1 of node C appears, as shown in (3) in FIG. 7.

Further, a connection line between node C and node D is moved so that node C moves to C1. Specifically, C1 is used as a target end point of the connection line between node C and node D, and C1 is connected with a start point of the connection line, i.e., node D, as specifically shown in (3) of FIG. 7. The connection line between node C and node D is moved to the connection line between C1 and node D, so that node C and C1 are made to coincide, so that a new position D1 of the node D appears, as shown in (4) in FIG. 7.

Further, a connection line between node D and node E is moved so that node D moves to D1. Specifically, D1 is used as a target end point of the connection line between node D and node E, and D1 is connected with a starting point of the connection line, i.e., node E, as shown in (4) in FIG. 7. The connection line between node D and node E is moved to the connection line between D1 and node E, and node D and D1 are made to coincide, so that a new position E1 of the node E appears, as shown in (5) in FIG. 7.

E1 may be marked as a first updated position of a first reference node, i.e., node E, and in an iterative process as shown in FIG. 7, a child node in a path from node A to node E affects at least one of a displacement or a rotation of a parent node. Optionally, the child node and the parent node are determined according to the tree structure corresponding to the virtual object. For example, node A is a child node of node B, and node B is a parent node of node A. A change of the position of node A causes a change of the position of node B, that is, a displacement of node A affects a displacement of node B. As shown in FIG. 7, node A moves from its original position prior to the collision to point F, causing node B to move to B1. In addition, since the connection line between node A and node B in (1) shown in FIG. 7 is the same connection line as the connection line between B1 and F in (2) shown in FIG. 7, an angle between the connection line between node A and node B in (1) shown in FIG. 7 and the connection line between B1 and F in (2) shown in FIG. 7 can be taken as a rotation angle of node B.

Furthermore, the iterative process shown in FIG. 7 may also be referred to as a forward iteration. That is, the forward iteration is performed starting with the child node where collision occurs, the child node affecting at least one of a displacement or a rotation of the parent node. In other embodiments, a maximum rotation angle for each limb joint may also be set to avoid excessive rotation at the limb joint.

In S602, a second iteration is performed in a direction from the first reference node towards the first node, wherein during the second iteration, the first reference node moves from the first updated position to the first original position, and a parent node in a path from the first reference node to the first node affects at least one of a displacement or a rotation of a child node.

Since node E is used as the first reference node, its position before and after the collision is unchanged, but after the iteration shown in FIG. 7, the position of node E is changed, and furthermore, it is necessary to perform a second iteration, which may also be referred to as a backward iteration, from node E to node A where the collision occurs. That is, the parent node affects at least one of the displacement or the rotation of the child node. Here, the child node and the parent node are also determined according to the corresponding tree structure of the virtual object. For example, node E is still a parent node of node D, which is a child node of node E. Node D is a parent node of node C, which is a child node of node D. Node C is a parent node of node B, which is a child node of node C. Node B is a parent node of node A, which is the child node of node B.

Figure 8:
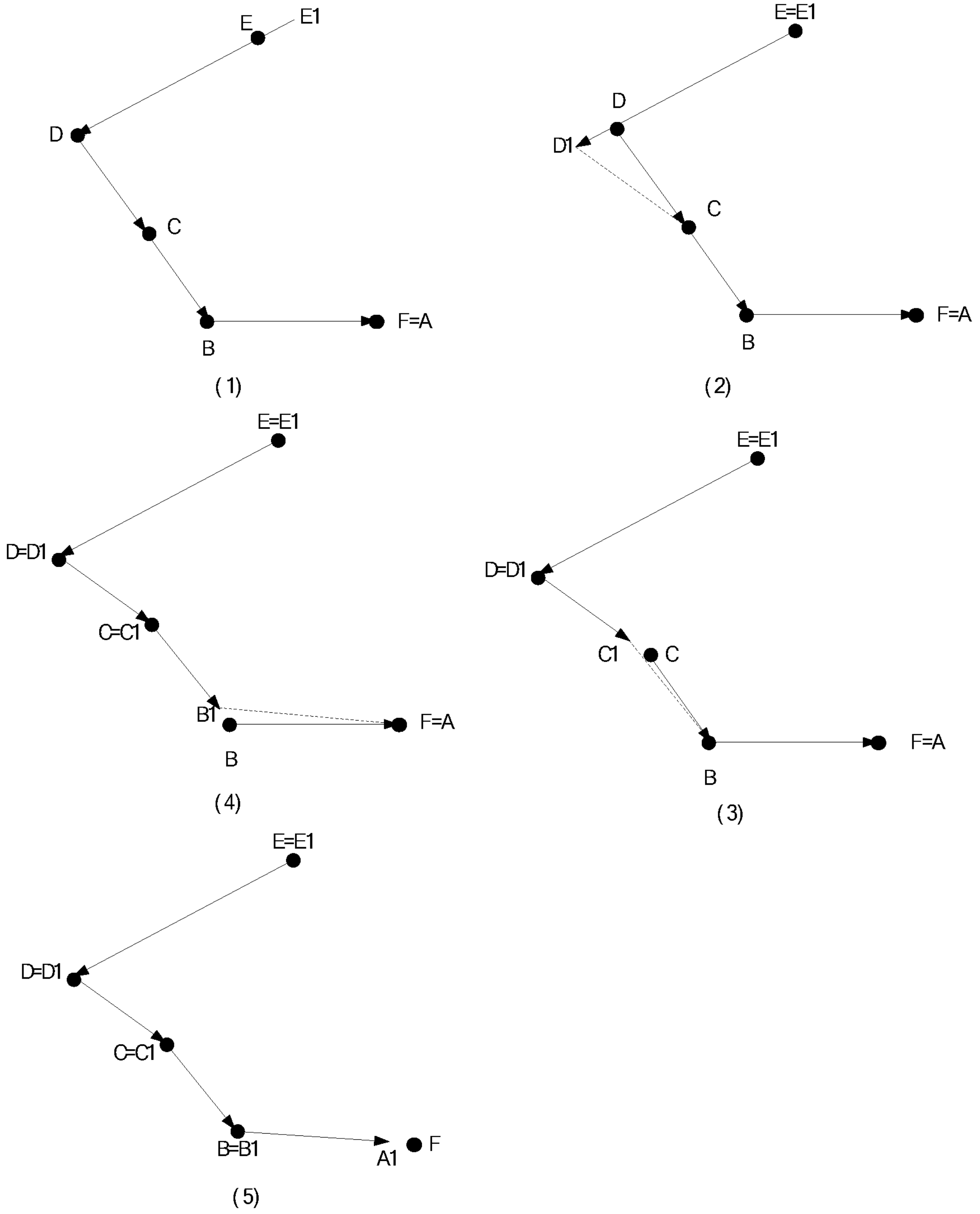
FIG. 8 is a schematic diagram of a second iteration in an embodiment of the present disclosure.

As shown in FIG. 8, a second iteration may be performed on the basis of (5) as shown in FIG. 7. Specifically, (1) shown in FIG. 8 may be (5) shown in FIG. 7. During a second iteration performed on the basis of (1) shown in FIG. 8, a connection line between E1 and node D may be moved such that E1 and node E coincide, i.e. the first reference node, i.e., node E, is moved from the first updated position E1 to the first original position, such that a new position D1 of node D appears, as shown in (2) of FIG. 8.

Further, the connection line between node C and node D needs to be moved so that the node D moves to D1. Specifically, D1 is used as a target starting point of the connection line between node C and node D, and D1 is connected to an end point of the connection line, i.e., node C, to obtain a connection line between D1 and node C, which is specifically shown as (2) in FIG. 8. The connection line between node C and node D is moved to the connection line between D1 and node C, and node D and D1 are made to coincide, so that a new position C1 of the node C appears, as shown in (3) in FIG. 8.

Further, the connection line between node B and node C is moved so that C moves to C1. Specifically, C1 is used as a target starting point of a connection line between node B and node C, and C1 is connected to the end point of the connection line, i.e., node B, to obtain a connection line between C1 and node B, which is specifically shown as (3) in FIG. 8. The connection line between node B and node C is moved to the connection line between C1 and node B, and node C and C1 are made to coincide, so that a new position B1 of node B appears, as shown in (4) in FIG. 8.

Further, the connection line between node A and node B is moved so that B moves to B1. Specifically, B1 is taken as a target starting point of the connection line between node A and node B, and B1 is connected to an end point of the connection line, i.e., node A, to obtain a connection line between B1 and node A, which is specifically shown as (4) in FIG. 8. The connection line between node A and node B is moved to the connection line between B1 and node A, and B1 and B are made to coincide, so that a new position A1 of node A appears, as shown in (5) in FIG. 8.

As can be seen from FIGS. 7 and 8, after the first iteration shown in FIG. 7 and the second iteration shown in FIG. 8 are performed, the position of node A in (1) shown in FIG. 7 is changed to the position of A1 in (5) shown in FIG. 8, and the position of A1 in (5) shown in FIG. 8 is closer to the position of the point F, i.e., the first target position of node A, than the position of node A in (1) shown in FIG. 7.

In S603, the second target position of the first node and the second target position of the each second node are determined according to a second updated position of the first node obtained by the second iteration.

As shown in FIG. 8, after the second iteration, a new position A1 of node A appears, and the new position A1 may be marked as a second updated position of node A. Further, according to the second updated positions of the node A, the second target positions corresponding to node A, node B, node C, node D, and node E, that is, the actual positions after the collision, may be determined.

In one possible implementation: the first node is a leaf node in the tree structure corresponding to the virtual object.

As shown in FIGS. 7 and 8, the node A at which the collision occurs is a leaf node in the tree structure corresponding to the virtual object. It will be appreciated that the leaf node is the end node, i.e., the bottom-most node, in the tree structure, and the leaf node has a parent node and no child nodes. And child nodes are nodes other than the root node and leaf nodes in the tree structure. In other embodiments, the child nodes may comprise leaf nodes.

Optionally, determining the second target position of the first node and the second target position of the each second node according to the second updated position of the first node obtained by the second iteration comprises: continuing to perform the first iteration and the second iteration according to the second updated position of the first node obtained by the second iteration to obtain the second target position of the first node and the second target position of the each second node in response to iteration times of the first iteration and the second iteration meeting a preset condition.

For example, in a case that node A where the collision occurs is a leaf node in the tree structure corresponding to the virtual object, the first iteration as shown in FIG. 7 and the second iteration as shown in FIG. 8 may be continued according to the second updated position of the node A, i.e., A1 as shown in FIG. 8. The first iteration and the second iteration can be regarded as one complete iteration, and each time the complete iteration is performed, node A after the iteration is closer to the position of point F, namely the first target position of node A. In this embodiment, a number of complete iterations may be preset, for example, M times. The value of M is not particularly limited. Specifically, the iteration is stopped after M complete iterations are performed, and the position of node A at this time may be used as the second target position of node A, that is, the actual position of node A after the collision. In addition, the positions corresponding to node B, node C, and node D obtained in the case where the complete iteration is stopped after the M times of complete iterations are performed may be sequentially used as the second target positions of node B, node C and node D, that is, the respective actual positions of node B, node C, and node D after the collision. The position of node E before and after the collision is unchanged.

Figure 9:
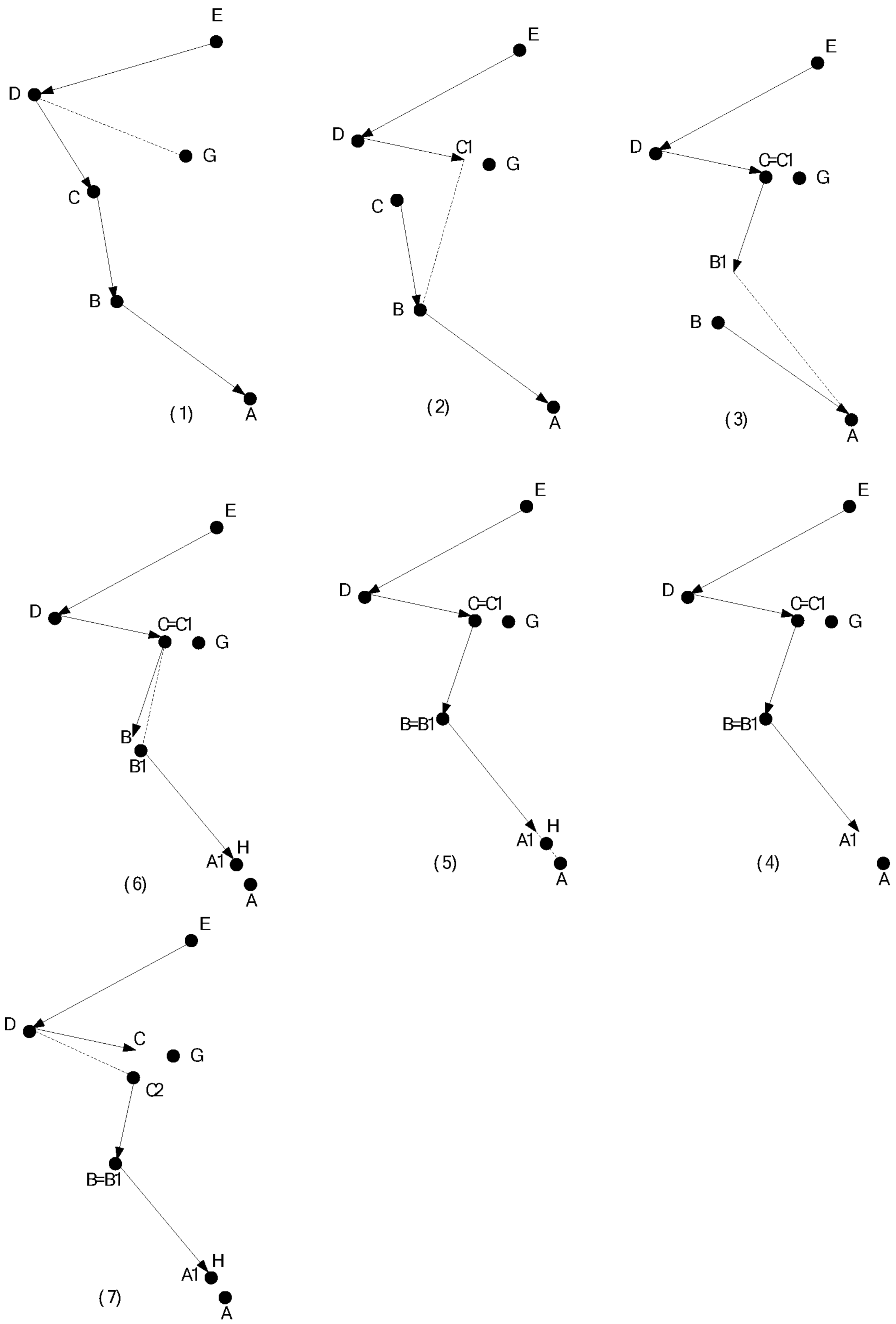
FIG. 9 is a schematic diagram of a third iteration and a fourth iteration in an embodiment of the present disclosure.

In another possible implementation: the first node is a non-leaf node in a tree structure corresponding to the virtual object. As shown in FIG. 9, node A, node B, node C, node D and node E are nodes in a tree structure corresponding to a virtual character, respectively, wherein an arrow direction is a direction from a parent node to a child node. For example, node A may be the left hand palm as shown in FIG. 4, node B may be node 47 as shown in FIG. 4, node C may be node 45 as shown in FIG. 4, node D may be node 43 as shown in FIG. 4, and node E may be node 40 as shown in FIG. 4. The node where a collision occurs is a non-leaf node in the tree structure corresponding to the virtual object. For example, the node where the collision occurs is node C, that is, node C may be denoted as a first node. And an ideal position of node C after the collision, namely a first target position, can be calculated according to force(s) applied to node C during the collision. Specifically, the force(s) applied to node C in the collision process may comprise an external force applied to node C in the collision process, an acting force applied to node C by the connection line between node B and node C, and an acting force applied to node C by the connection line between node C and node D. A first target position of node C may be a position of point G in (1) as shown in FIG. 9, and the position of point G may be fixed. Each of node A, node B, node D, and node E is a second node connected directly or indirectly to node C. Likewise, node E serves as a first reference node whose position before and after the collision is unchanged. Further, the first iteration may be performed in a direction from node C to node E, and the process of the first iteration may refer to the principle of the first iteration shown in FIG. 7, which is not described herein again. After the first iteration, a second iteration may be performed in a direction from node E to node C, and the process of the second iteration may refer to the principle of the second iteration shown in FIG. 8, which is not described herein again. After the second iteration, a new position C1 for node C may be obtained, such as (2) shown in FIG. 9, C1 being closer to the position of point G than node C. C1 may be denoted as a second updated position of node C. Further, according to the second updated position of node C, second target positions corresponding to node A, node B, node C, node D and node E, i.e., the actual positions after the collision, are determined, respectively.

Figure 10:
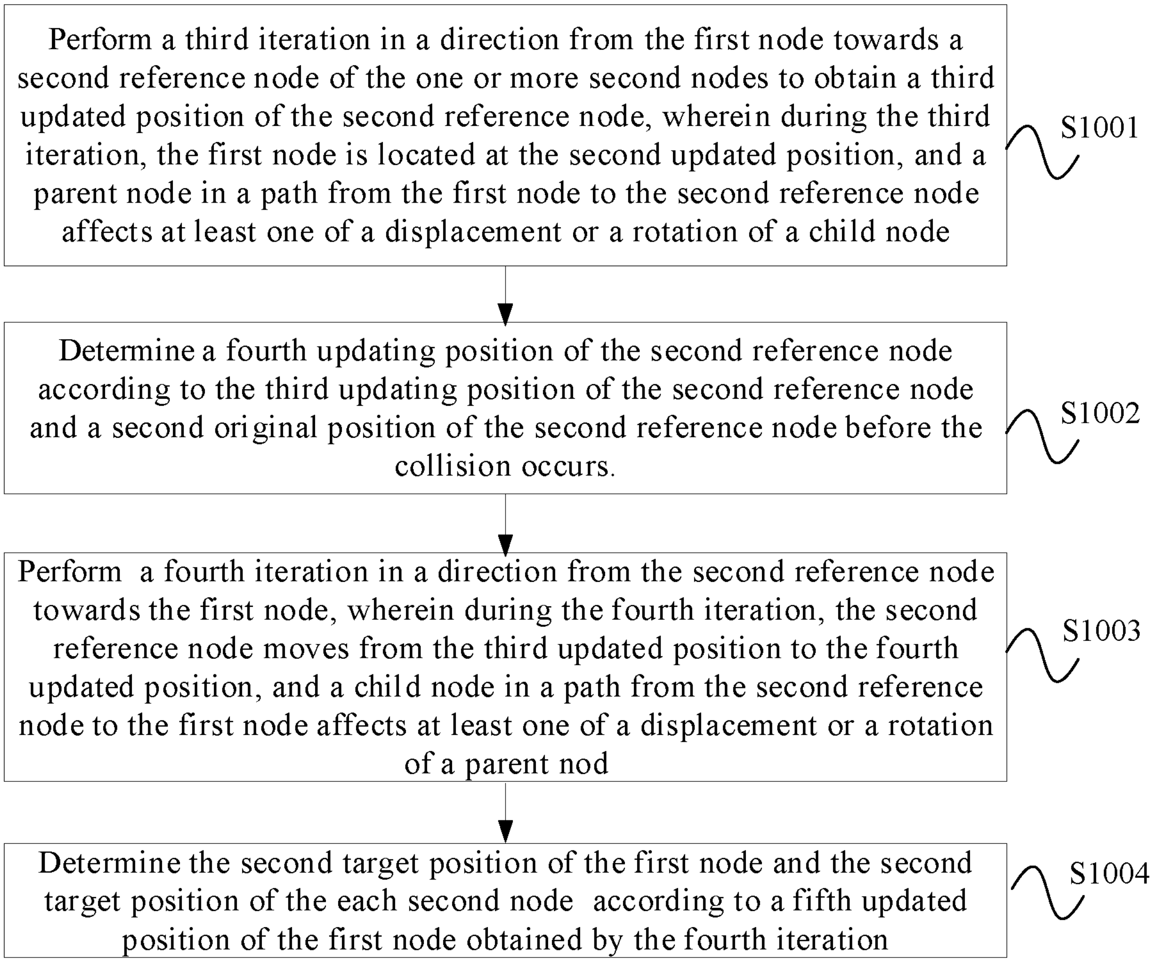
FIG. 10 is still another flow chart of a collision processing method of a virtual object in an embodiment of the present disclosure.

Optionally, the second target position of the first node and the second target position of the each second node are determined according to the second updated position of the first node obtained by the second iteration, which comprises the following steps S1001 to S1004 shown in FIG. 10.

In S1001, a third iteration is performed in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node.

As shown in FIG. 9, node A may be taken as a second reference node. A third iteration is performed in a direction starting from node C towards node A. As for the third iteration, please refer to the second iteration shown in FIG. 8 above. Namely, during the third iteration, a parent node influences at least one of a displacement or a rotation of a child node in a path from node C to node A. Specifically, C1 and node B may be connected to obtain a connection line between C1 and node B, as shown in (2) of FIG. 9. Further, the connection line between node B and node C is moved to the connection line between C1 and node B, and node C and C1 are made to coincide, so that a new position B1 of node B appears, as shown in (3) of FIG. 9. B1 is connected with node A to obtain a connection line between B1 and node A as shown in (3) of FIG. 9. Further, the connection line between node A and node B is moved to the connection line between B1 and node A, and node B and B1 are made to coincide, so that a new position A1 of node A appears, as shown in FIG. 9 (4), and the new position A1 can be denoted as a third updated position of node A.

In S1002, a fourth updating position of the second reference node is determined according to the third updating position of the second reference node and a second original position of the second reference node before the collision occurs.

As shown in (4) of FIG. 9, A1 is a third updated position of node A, and the position of node A is a second original position of node A before the collision occurs. A fourth updated position of node A can be determined according to the third updated position and the second original position.

Optionally, determining a fourth updated position of the second reference node according to the third updated position of the second reference node and a second original position of the second reference node before the collision occurs comprises: determining a connection line between the third updated position and the second original position of the second reference node before the collision occurs according to the third updated position of the second reference node and the second original position of the second reference node before the collision occurs; and selecting a point from the connection line as a fourth updated position of the second reference node.

As shown in (5) of FIG. 9, A1 and node A may be connected to obtain a connection line between A1 and node A, and a point is randomly selected from the connection line as a fourth updated position of node A. For example, point H is a point in the connection line between A1 and node A, and point H may be used as the fourth updated position of node A.

In S1003, a fourth iteration is performed in a direction from the second reference node towards the first node, wherein during the fourth iteration, the second reference node moves from the third updated position to the fourth updated position, and a child node in a path from the second reference node to the first node affects at least one of a displacement or a rotation of a parent node.

Further, a fourth iteration is performed in a direction from node A to node C, and as for the fourth iteration, please refer to the first iteration shown in FIG. 7. That is, during the fourth iteration, in a path from node A to node C, a child node affects at least one of a displacement or a rotation of a parent node. Specifically, on the basis of (5) shown in FIG. 9, the connection line between node B and A1 may be moved so that A1 and point H coincide, and a new position B1 of node B appears, as shown in (6) in FIG. 9. B1 is connected with node C to obtain a connection line between B1 and node C, as shown in (6) of FIG. 9. Further, the connection line between node B and node C is moved to the connection line between B1 and node C, and node B and B1 are made to coincide, so that a new position C2 of node C appears, as shown in (7) of FIG. 9.

In S1004, the second target position of the first node and the second target position of the each second node are determined according to a fifth updated position of the first node obtained by the fourth iteration.

As shown in (7) of FIG. 9, a new position C2 of node C obtained after the fourth iteration can be recorded as a fifth updated position of node C. Further, the second target positions, that is, the actual positions after the collision corresponding to node A, node B, node C, node D and node E, may be determined, respectively, according to the fifth updated position of node C.

Optionally, determining the second target position of the first node and the second target position of the each second node according to the fifth updated position of the first node obtained by the fourth iteration comprises: continuing to perform the first iteration, the second iteration, the third iteration and the fourth iteration according to the fifth updated position of the first node obtained by the fourth iteration, and obtaining the second target position of the first node and the second target position of the each second node in response to the iteration times of the first iteration, the second iteration, the third iteration and the fourth iteration meeting a preset condition.

For example, the first iteration from node C to node E, the second iteration from node E to node C, the third iteration from node C to node A, and the fourth iteration from node A to node C continue according to C2 in (7) as shown in FIG. 9. A first iteration from node C to node E, a second iteration from node E to node C, a third iteration from node C to node A, and a fourth iteration from node A to node C may be considered as one complete iteration here. In this embodiment, a number of complete iterations may be preset as, for example, M times. The value of M is not particularly limited. Specifically, the iteration is stopped after M complete iterations are performed, and the position of node C at this time may be used as the second target position of node C, that is, the actual position of node C after the collision. In addition, the positions corresponding to node A, node B and node D obtained when the iteration is stopped after the M times of complete iterations are executed may be sequentially used as the second target positions of node A, node B and node D, i.e., the actual positions of node A, node B, and node D after the collision occurs. The position of node E before and after the collision is unchanged.

It will be appreciated that every time a complete iteration is performed, the positions of the nodes participating in the iteration may change once. For example, as shown in FIG. 9, the positions of node A, node B, node C and node D may change once for each complete iteration. During the course of M complete iterations, the positions of node A, node B, node C and node D may be constantly changed. For a terminal displaying a virtual character, the terminal may display the changed positions of node A, node B, node C, and node D after each complete iteration. Alternatively, the terminal may display the finally changed positions of node A, node B, node C and node D after the M complete iterations are finished.

According to the collision processing method of a virtual object provided in the embodiment of the present disclosure, in response to the first node where the collision occurs being a leaf node, the position of the first node after iteration gradually approaches to the first target position determined according to the force applied to the first node in the collision process through iteration from the first node to the first reference node for multiple times and iteration from the first reference node to the first node for multiple times. In addition, in response to the first node where the collision occurs being a non-leaf node, the first node where the collision occurs can drive the leaf node and other nodes between the first node and the leaf node to change positions by iterating from the first node to the first reference node for multiple times, iterating from the first reference node to the first node for multiple times, iterating from the first node to the second reference node for multiple times, and iterating from the second reference node to the first node for multiple times. Furthermore, the more the number of iterations, the more accurate the actual position of the first node after the collision is, and the more natural the actual position of the second node directly or indirectly connected to the first node after the collision is, which makes the picture more real.

Figure 11:
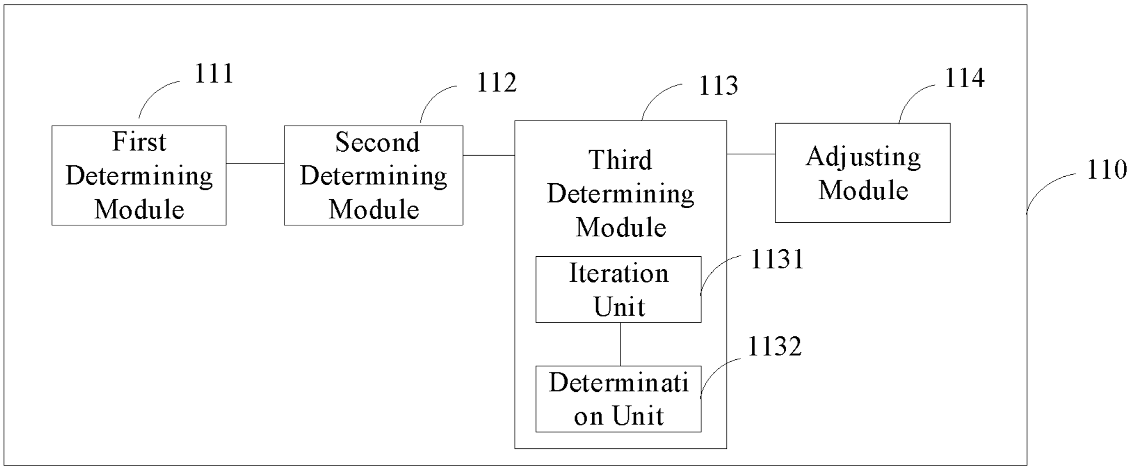
FIG. 11 is a schematic structural diagram of a collision processing apparatus of a virtual object in an embodiment of the present disclosure.

FIG. 11 is a schematic structural diagram of a collision processing apparatus of a virtual object in an embodiment of the present disclosure. The collision processing apparatus of a virtual object provided in the embodiment of the present disclosure may be configured in a client, or in a server. The collision processing apparatus 110 of a virtual object specifically comprises:

- a first determining module 111 configured to, in response to a collision occurring to the virtual object, determine a first node of the virtual object and one or more second nodes of the virtual object, the collision occurring to the first node, and each second node of the one or more second nodes being directly or indirectly connected with the first node;
- a second determining module 112 configured to determine a first target position of the first node according to a force applied to the first node during the collision;
- a third determining module 113 configured to determine a second target position of the first node and a second target position of the each second node according to the first target position; and
- an adjusting module 114 configured to adjust a posture of the virtual object in a user interface according to the second target position of the first node and the second target position of the each second node.

Optionally, the third determining module 113 is specifically configured to:

- determine the second target position of the first node and the second target position of the each second node according to the first target position and a first original position of a first reference node in the one or more second nodes before the collision occurs, wherein the second target position of the first reference node is the first original position.

Optionally, the third determining module 113 comprise: an iteration unit 1131 and a determination unit 1132; wherein the iteration unit 1131 is configured to: perform a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node; perform a second iteration in a direction from the first reference node towards the first node, wherein during the second iteration, the first reference node moves from the first updated position to the first original position, and a parent node in a path from the first reference node to the first node affects at least one of a displacement or a rotation of a child node; and the determination unit 1132 is configured to determine the second target position of the first node and the second target position of the each second node according to a second updated position of the first node obtained by the second iteration.

Optionally, the iteration unit 1131 is specifically configured to: continue to perform the first iteration and the second iteration according to the second updated position of the first node obtained by the second iteration to obtain the second target position of the first node and the second target position of the each second node in response to iteration times of the first iteration and the second iteration meeting a preset condition.

Optionally, the first node is a leaf node in a tree structure corresponding to the virtual object.

Optionally, the iteration unit 1131 is further configured to: perform a third iteration in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node; the determining unit 1132 is further configured to: determine a fourth updating position of the second reference node according to the third updating position of the second reference node and a second original position of the second reference node before the collision occurs; the iteration unit 1131 is further configured to: perform a fourth iteration in a direction from the second reference node towards the first node, wherein during the fourth iteration, the second reference node moves from the third updated position to the fourth updated position, and a child node in a path from the second reference node to the first node affects at least one of a displacement or a rotation of a parent node; the determining unit 1132 is further configured to: determine the second target position of the first node and the second target position of the each second node according to a fifth updated position of the first node obtained by the fourth iteration.

Optionally, the determining unit 1132 is specifically configured to: continue to perform the first iteration, the second iteration, the third iteration and the fourth iteration according to the fifth updated position of the first node obtained by the fourth iteration; and obtain the second target position of the first node and the second target position of the each second node in response to the iteration times of the first iteration, the second iteration, the third iteration and the fourth iteration meeting a preset condition.

Optionally, the first node is a non-leaf node in a tree structure corresponding to the virtual object.

Optionally, the determining unit 1132 is specifically configured to: determine a connection line between the third updated position and the second original position of the second reference node according to the third updated position of the second reference node and the second original position of the second reference node before the collision occurs; and select a point from the connection line as the fourth updated position of the second reference node.

Optionally, the child node and the parent node are determined according to a tree structure corresponding to the virtual object.

Optionally, each node in a tree structure corresponding to the virtual object corresponds to a first bounding sphere. It is determined that the collision occurs to the virtual object in response to the first bounding sphere colliding with a second bounding sphere of another physical entity in a virtual scene.

Optionally, the force applied to the first node during the collision is a force applied to the first bounding ball corresponding to the first node during the collision.

The apparatus for processing collision of a virtual object provided in the embodiment of the present disclosure may execute the steps executed by a client or a server in the method for processing collision of a virtual object provided in the embodiment of the present disclosure, and the steps and the beneficial effects are not described herein again.

Figure 12:
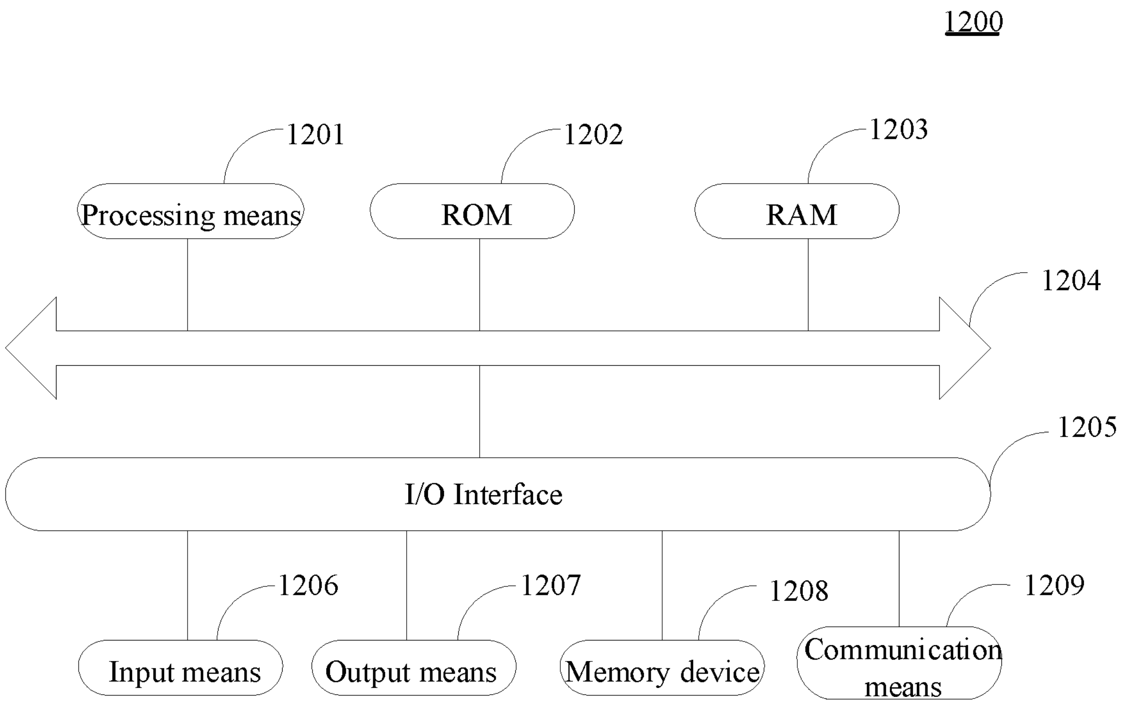
FIG. 12 is a schematic structural diagram of an electronic device in an embodiment of the present disclosure.

FIG. 12 is a schematic structural diagram of an electronic device in an embodiment of the present disclosure. Referring now specifically to FIG. 12, a schematic block diagram of an electronic device 1200 adapted to implement the embodiments of the present disclosure is shown. The electronic device 1200 in the embodiments of the present disclosure may include, but is not limited to, mobile terminals such as mobile phones, notebook computers, digital broadcast receivers, PDAs (personal digital assistants), PADs (tablet computers), PMPs (portable multimedia players), in-vehicle terminals (e.g., vehicle navigation terminals), wearable electronic devices, and the like, and fixed terminals such as digital TVs, desktop computers, smart home devices, and the like. The electronic device shown in FIG. 12 is only an example, and should not bring any limitation to the functions and the scope of use of the embodiments of the present disclosure.

As shown in FIG. 12, the electronic device 1200 may comprise a processing means (e.g., a central processing unit, a graphic processor, etc.) 1201, which may perform various appropriate actions and processes according to a program stored in a Read Only Memory (ROM) 1202 or a program loaded from a storage means 1208 into a Random Access Memory (RAM) 1203 to implement the collision processing method of a virtual object according to the embodiment described in the present disclosure. In the RAM 1203, various programs and data necessary for the operation of the electronic device 1200 are also stored. The processing means 1201, the ROM 1202, and the RAM 1203 are connected to each other by a bus 1204. An input/output (I/O) interface 1205 is also connected to the bus 1204.

Generally, the following means may be connected to the I/O interface 1205: input means 1206 comprising, for example, a touch screen, a touch pad, a keyboard, a mouse, a camera, a microphone, an accelerometer, a gyroscope, or the like; output means 1207 comprising, for example, a Liquid Crystal Display (LCD), a speaker, a vibrator, and the like; memory device 1208 comprise, for example, magnetic tape, hard disk, etc.; and a communication means 1209. The communication means 1209 may allow the electronic device 1200 to communicate in a wireless or wired manner with other means to exchange data. While FIG. 12 illustrates an electronic device 1200 having various means, it is to be understood that not all illustrated means are required to be implemented or provided. More or fewer means may be alternatively implemented or provided.

In particular, the process described above with reference to the flow chart may be implemented as a computer software program, according to the embodiments of the present disclosure. For example, the embodiments of the present disclosure comprise a computer program product comprising a computer program carried on a non-transitory computer readable medium, the computer program containing program code for performing the method illustrated by the flow chart, thereby implementing the collision processing method of a virtual object as described above. In such embodiments, the computer program may be downloaded and installed from a network through the communication means 1209, or installed from the memory device 1208 or the ROM 1202. The computer program, when executed by the processing means 1201, performs the above-described functions defined in the method of the embodiments of the present disclosure.

It should be noted that the computer readable medium of the present disclosure may be a computer readable signal medium or a computer readable storage medium or any combination of the two. A computer readable storage medium may be, for example, but not limited to, an electronic, magnetic, optical, electromagnetic, infrared, or semiconductor system, apparatus, or device, or any combination of the foregoing. More specific examples of the computer readable storage medium may comprise, but are not limited to: an electrical connection having one or more wires, a portable computer disk, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. In contrast, in the present disclosure, the computer readable signal medium may include a propagated data signal with computer readable program code carried therein in baseband or as part of a carrier wave. Such a propagated data signal may take any of a variety of forms, including, but not limited to, an electro-magnetic signal, an optical signal, or any suitable combination thereof. A computer readable signal medium may be any computer readable medium that is not a computer readable storage medium and that can communicate, propagate, or transport a program for use by or in connection with an instruction execution system, apparatus, or device. Program codes included in a computer readable medium may be transmitted using any appropriate medium, including but not limited to: electrical wires, optical cables, RF (radio frequency), etc., or any suitable combination thereof.

In some embodiments, the clients and servers may communicate using any currently known or future developed network protocol, such as HTTP (HyperText Transfer Protocol), and may be interconnected with any form or medium of digital data communication (e.g., a communication network). Examples of communication networks include a local area network ("LAN"), a wide area network ("WAN"), the Internet (e.g., the Internet), and peer-to-peer networks (e.g., ad hoc peer-to-peer networks), as well as any currently known or future developed network.

The computer readable medium may be embodied in the electronic device; or may be separate and not incorporated into the electronic device.

The computer readable medium carries one or more programs which, when executed by the electronic device, cause the electronic device to:

- in response to a collision occurring to a virtual object, determine a first node of the virtual object and one or more second nodes of the virtual object, the collision occurring to the first node, and each second node of the one or more second nodes being directly or indirectly connected with the first node;
- determine a first target position of the first node according to a force applied to the first node during the collision;
- determine a second target position of the first node and a second target position of the each second node according to the first target position; and
- adjust a posture of the virtual object in a user interface according to the second target position of the first node and the second target position of the each second node.

Optionally, when the one or more programs are executed by the electronic device, the electronic device may also perform other steps described in the above embodiments.

The computer program codes for performing the operations of the present disclosure may be written in one or more programming languages or combination thereof, including but not limited to an object oriented programming language such as Java, Smalltalk, C++, including conventional procedural programming languages, such as the "C" programming language or similar programming languages. The program codes may be executed entirely on the user's computer, partly on the user's computer, as a stand-alone software package, partly on the user's computer and partly on a remote computer or entirely on a remote computer or server. In the situation involving a remote computer, the remote computer may be connected to the user's computer through any type of network, including a Local Area Network (LAN) or a Wide Area Network (WAN), or the connection may be made to an external computer (for example, through the Internet using an Internet service provider).

The flow charts and block diagrams in the figures illustrate the architecture, functionality, and operation of possible implementations of systems, methods and computer program products according to various embodiments of the present disclosure. In this regard, each block in the flow charts or block diagrams may represent a module, a program segment, or a part of codes, which comprises one or more executable instructions for implementing the specified logical function(s) It should also be noted that, in some alternative implementations, the functions noted in the blocks may occur in an order different from that marked in the accompanying drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

The units described in the embodiments of the present disclosure may be implemented by software or hardware. The name of an element does not constitute a limitation on the element itself in some cases.

The functions described herein above may be performed, at least in part, by one or more hardware logic components. For example, without limitation, exemplary types of hardware logic components that may be used include: field programmable gate arrays (FPGAs), application specific integrated circuits (ASICs), application specific standard products (ASSPs), systems on a chip (SOCs), complex programmable logic apparatuses (CPLDs), and the like.

In the context of this disclosure, a machine-readable medium may be a tangible medium that can contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination thereof. More specific examples of a machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof.

According to one or more embodiments of the present disclosure, there is provided a collision processing method for a virtual object, comprising:

- in response to a collision occurring to the virtual object, determining a first node of the virtual object and one or more second nodes of the virtual object, the collision occurring to the first node, and each second node of the one or more second nodes being directly or indirectly connected with the first node;

determining a first target position of the first node according to a force applied to the first node during the collision;

determining a second target position of the first node and a second target position of the each second node according to the first target position; and adjusting a posture of the virtual object in a user interface according to the second target position of the first node and the second target position of the each second node.

According to one or more embodiments of the present disclosure, in the collision processing method of a virtual object provided by the present disclosure, the determining the second target position of the first node and the second target position of the each second node according to the first target position comprises:

determining the second target position of the first node and the second target position of the each second node according to the first target position and a first original position of a first reference node in the one or more second nodes before the collision occurs, wherein the second target position of the first reference node is the first original position.

According to one or more embodiments of the present disclosure, in a collision processing method of a virtual object provided by the present disclosure, the determining the second target position of the first node and the second target position of the each second node according to the first target position and the first original position of the first reference node in the one or more second nodes before the collision occurs comprises:

performing a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node;

performing a second iteration in a direction from the first reference node towards the first node, wherein during the second iteration, the first reference node moves from the first updated position to the first original position, and a parent node in a path from the first reference node to the first node affects at least one of a displacement or a rotation of a child node; and determining the second target position of the first node and the second target position of the each second node according to a second updated position of the first node obtained by the second iteration.

According to one or more embodiments of the present disclosure, in the collision processing method for a virtual object provided by the present disclosure, the determining the second target position of the first node and the second target position of the each second node according to the second updated position of the first node obtained by the second iteration comprises:

continuing to perform the first iteration and the second iteration according to the second updated position of the first node obtained by the second iteration to obtain the second target position of the first node and the second target position of the each second node in response to iteration times of the first iteration and the second iteration meeting a preset condition.

According to one or more embodiments of the present disclosure, in the collision processing method for a virtual object provided by the present disclosure, the first node is a leaf node in a tree structure, the tree structure corresponding to the virtual object.

According to one or more embodiments of the present disclosure, in the collision processing method for a virtual object provided by the present disclosure, the determining the second target position of the first node and the second target position of the each second node according to the second updated position of the first node obtained by the second iteration comprises:

performing a third iteration in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node;

determining a fourth updating position of the second reference node according to the third updating position of the second reference node and a second original position of the second reference node before the collision occurs;

performing a fourth iteration in a direction from the second reference node towards the first node, wherein during the fourth iteration, the second reference node moves from the third updated position to the fourth updated position, and a child node in a path from the second reference node to the first node affects at least one of a displacement or a rotation of a parent node; and determining the second target position of the first node and the second target position of the each second node according to a fifth updated position of the first node obtained by the fourth iteration.

According to one or more embodiments of the present disclosure, in the collision processing method for a virtual object provided by the present disclosure, the determining the second target position of the first node and the second target position of the each second node according to the second updated position of the first node obtained by the second iteration comprises:

continuing to perform the first iteration, the second iteration, the third iteration and the fourth iteration according to the fifth updated position of the first node obtained by the fourth iteration; and obtaining the second target position of the first node and the second target position of the each second node in response to the iteration times of the first iteration, the second iteration, the third iteration and the fourth iteration meeting a preset condition.

According to one or more embodiments of the present disclosure, in the collision processing method for a virtual object provided by the present disclosure, the first node is a non-leaf node in a tree structure, the tree structure corresponding to the virtual object.

According to one or more embodiments of the present disclosure, in a collision processing method of a virtual object provided by the present disclosure, the determining the fourth updating position of the second reference node according to the third updating position of the second reference node and the second original position of the second reference node before the collision occurs comprises:

determining a connection line between the third updated position and the second original position of the second reference node according to the third updated position of the second reference node and the second original position of the second reference node before the collision occurs; and selecting a point from the connection line as the fourth updated position of the second reference node.

According to one or more embodiments of the present disclosure, in the collision processing method of the virtual object provided by the present disclosure, the child node and the parent node are determined according to a tree structure corresponding to the virtual object.

According to one or more embodiments of the present disclosure, in the collision processing method for a virtual object provided by the present disclosure, each node in a tree structure corresponding to the virtual object corresponds to a first bounding sphere, and the method further comprises:

determining that the collision occurs to the virtual object in response to the first bounding sphere colliding with a second bounding sphere of another physical entity in a virtual scene.

According to one or more embodiments of the present disclosure, in the collision processing method of a virtual object provided by the present disclosure, the force applied to the first node during the collision is a force applied to the first bounding ball corresponding to the first node during the collision.

According to one or more embodiments of the present disclosure, there is provided a collision processing apparatus of a virtual object, comprising:

a first determining module configured to, in response to a collision occurring to the virtual object, determine a first node of the virtual object and one or more second nodes of the virtual object, the collision occurring to the first node, and each second node of the one or more second nodes being directly or indirectly connected with the first node;

a second determining module configured to determine a first target position of the first node according to a force applied to the first node during the collision;

a third determining module configured to determine a second target position of the first node and a second target position of the each second node according to the first target position; and an adjusting module configured to adjust a posture of the virtual object in a user interface according to the second target position of the first node and the second target position of the each second node.

According to one or more embodiments of the present disclosure, in the collision processing apparatus of a virtual object provided by the present disclosure, the third determining module is specifically configured to:

determine the second target position of the first node and the second target position of the each second node according to the first target position and a first original position of a first reference node in the one or more second nodes before the collision occurs, wherein the second target position of the first reference node is the first original position.

According to one or more embodiments of the present disclosure, in the collision processing apparatus of a virtual object provided by the present disclosure, the third determining module comprise: an iteration unit and a determination unit; wherein the iteration unit is configured to: perform a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node; perform a second iteration in a direction from the first reference node towards the first node, wherein during the second iteration, the first reference node moves from the first updated position to the first original position, and a parent node in a path from the first reference node to the first node affects at least one of a displacement or a rotation of a child node; and the determination unit is configured to determine the second target position of the first node and the second target position of the each second node according to a second updated position of the first node obtained by the second iteration.

According to one or more embodiments of the present disclosure, in the collision processing apparatus of a virtual object provided by the present disclosure, the iteration unit is specifically configured to: continue to perform the first iteration and the second iteration according to the second updated position of the first node obtained by the second iteration to obtain the second target position of the first node and the second target position of the each second node in response to iteration times of the first iteration and the second iteration meeting a preset condition.

According to one or more embodiments of the present disclosure, in the collision processing apparatus of a virtual object provided by the present disclosure, the first node is a leaf node in a tree structure corresponding to the virtual object.

According to one or more embodiments of the present disclosure, in the collision processing apparatus of a virtual object provided by the present disclosure, the iteration unit is further configured to: perform a third iteration in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node; the determining unit is further configured to: determine a fourth updating position of the second reference node according to the third updating position of the second reference node and a second original position of the second reference node before the collision occurs; the iteration unit is further configured to: perform a fourth iteration in a direction from the second reference node towards the first node, wherein during the fourth iteration, the second reference node moves from the third updated position to the fourth updated position, and a child node in a path from the second reference node to the first node affects at least one of a displacement or a rotation of a parent node; the determining unit is further configured to: determine the second target position of the first node and the second target position of the each second node according to a fifth updated position of the first node obtained by the fourth iteration.

According to one or more embodiments of the present disclosure, in the collision processing apparatus of a virtual object provided by the present disclosure, the determining unit is specifically configured to: continue to perform the first iteration, the second iteration, the third iteration and the fourth iteration according to the fifth updated position of the first node obtained by the fourth iteration; and obtain the second target position of the first node and the second target position of the each second node in response to the iteration times of the first iteration, the second iteration, the third iteration and the fourth iteration meeting a preset condition.

According to one or more embodiments of the present disclosure, in the collision processing apparatus of a virtual object provided by the present disclosure, the first node is a non-leaf node in a tree structure corresponding to the virtual object.

According to one or more embodiments of the present disclosure, in the collision processing apparatus of a virtual object provided by the present disclosure, determining unit is specifically configured to: determine a connection line between the third updated position and the second original position of the second reference node according to the third updated position of the second reference node and the second original position of the second reference node before the collision occurs; and select a point from the connection line as the fourth updated position of the second reference node.

According to one or more embodiments of the present disclosure, in a collision processing apparatus of a virtual object provided by the present disclosure, the child node and the parent node are determined according to a tree structure corresponding to the virtual object.

According to one or more embodiments of the present disclosure, in the collision processing apparatus of a virtual object provided by the present disclosure, each node in a tree structure corresponding to the virtual object corresponds to a first bounding sphere. It is determined that the collision occurs to the virtual object in response to the first bounding sphere colliding with a second bounding sphere of another physical entity in a virtual scene.

According to one or more embodiments of the present disclosure, in the collision processing apparatus of a virtual object provided by the present disclosure, the force applied to the first node during the collision is a force applied to the first bounding ball corresponding to the first node during the collision.

According to one or more embodiments of the present disclosure, there is provided an electronic device comprising: one or more processors;

a memory for storing one or more programs;

when executed by the one or more processors, wherein the one or more programs, when executed by the one or more processors, cause the one or more processors to implement the method of collision processing of a virtual object as provided by any of the present disclosure.

According to one or more embodiments of the present disclosure, there is provided a non-transitory computer-readable storage medium having stored thereon a computer program which, when executed by a processor, implements the collision processing method of a virtual object provided in any of the embodiments of the present disclosure.

The embodiments of the present disclosure further provide a computer program, comprising: instructions which, when executed by a processor, implement the collision processing method of a virtual object as described above.

The embodiments of the present disclosure also provide a computer program product comprising a computer program or instructions which, when executed by a processor, implement the collision processing method of a virtual object as described above.

The foregoing description is only exemplary of the preferred embodiments of the disclosure and is illustrative of the principles of the technology employed. It will be appreciated by those skilled in the art that the scope of the disclosure herein is not limited to the particular combination of features described above, but also encompasses other technical solutions formed by any combination of the technical features described above or equivalents thereof without departing from the spirit of the disclosure, such as technical solutions formed by mutual replacement of the above features and the technical features disclosed in the present disclosure (but not limited to) having similar functions.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed is:

1. A method for collision processing of a virtual object, comprising:

in response to a collision occurring to the virtual object, determining a first node of the virtual object and one or more second nodes of the virtual object, the collision occurring to the first node, and each second node of the one or more second nodes being directly or indirectly connected with the first node;

determining a first target position of the first node according to a force applied to the first node during the collision;

determining a second target position of the first node and a second target position of the each second node according to the first target position, comprising: determining the second target position of the first node and the second target position of the each second node according to the first target position and a first original position of a first reference node in the one or more second nodes before the collision occurs, wherein the second target position of the first reference node is the first original position; and adjusting a posture of the virtual object in a user interface according to the second target position of the first node and the second target position of the each second node;

the determining the second target position of the first node and the second target position of the each second node comprises:

performing a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node.

2. The method of claim 1 wherein the determining the second target position of the first node and the second target position of the each second node according to the first target position and the first original position of the first reference node in the one or more second nodes before the collision occurs further comprises:

performing a second iteration in a direction from the first reference node towards the first node, wherein during the second iteration, the first reference node moves from the first updated position to the first original position, and a parent node in a path from the first reference node to the first node affects at least one of a displacement or a rotation of a child node; and determining the second target position of the first node and the second target position of the each second node according to a second updated position of the first node obtained by the second iteration.

3. The method of claim 2, wherein the determining the second target position of the first node and the second target position of the each second node according to the second updated position of the first node obtained by the second iteration comprises:

continuing to perform the first iteration and the second iteration according to the second updated position of the first node obtained by the second iteration to obtain the second target position of the first node and the second target position of the each second node in response to iteration times of the first iteration and the second iteration meeting a preset condition.

4. The method of claim 3, wherein the first node is a leaf node in a tree structure, the tree structure corresponding to the virtual object.

5. The method of claim 2, wherein the determining the second target position of the first node and the second target position of the each second node according to the second updated position of the first node obtained by the second iteration comprises:

performing a third iteration in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node;

determining a fourth updating position of the second reference node according to the third updating position of the second reference node and a second original position of the second reference node before the collision occurs;

performing a fourth iteration in a direction from the second reference node towards the first node, wherein during the fourth iteration, the second reference node moves from the third updated position to the fourth updated position, and a child node in a path from the second reference node to the first node affects at least one of a displacement or a rotation of a parent node; and determining the second target position of the first node and the second target position of the each second node according to a fifth updated position of the first node obtained by the fourth iteration.

6. The method of claim 5, wherein the determining the second target position of the first node and the second target position of the each second node according to the second updated position of the first node obtained by the second iteration comprises:

continuing to perform the first iteration, the second iteration, the third iteration and the fourth iteration according to the fifth updated position of the first node obtained by the fourth iteration; and obtaining the second target position of the first node and the second target position of the each second node in response to the iteration times of the first iteration, the second iteration, the third iteration and the fourth iteration meeting a preset condition.

7. The method of claim 6, wherein the first node is a non-leaf node in a tree structure, the tree structure corresponding to the virtual object.

8. The method of claim 5, wherein the determining the fourth updating position of the second reference node according to the third updating position of the second reference node and the second original position of the second reference node before the collision occurs comprises:

determining a connection line between the third updated position and the second original position of the second reference node according to the third updated position of the second reference node and the second original position of the second reference node before the collision occurs; and selecting a point from the connection line as the fourth updated position of the second reference node.

9. The method of claim 2, wherein the child node and the parent node are determined according to a tree structure corresponding to the virtual object.

10. The method according to claim 1, wherein each node in a tree structure corresponding to the virtual object corresponds to a first bounding sphere, and the method further comprises:

determining that the collision occurs to the virtual object in response to the first bounding sphere colliding with a second bounding sphere of another physical entity in a virtual scene.

11. The method according to claim 10, wherein the force applied to the first node during the collision is a force applied to the first bounding ball corresponding to the first node during the collision.

12. An electronic device, comprising:

one or more processors;

a memory device for storing one or more programs, wherein the one or more programs, when executed by the one or more processors, cause the one or more processors to implement a method for collision processing of a virtual object comprising:

in response to a collision occurring to the virtual object, determining a first node of the virtual object and one or more second nodes of the virtual object, the collision occurring to the first node, and each second node of the one or more second nodes being directly or indirectly connected with the first node;

determining a first target position of the first node according to a force applied to the first node during the collision;

determining a second target position of the first node and a second target position of the each second node according to the first target position, comprising: determining the second target position of the first node and the second target position of the each second node according to the first target position and a first original position of a first reference node in the one or more second nodes before the collision occurs, wherein the second target position of the first reference node is the first original position; and adjusting a posture of the virtual object in a user interface according to the second target position of the first node and the second target position of the each second node;

the determining the second target position of the first node and the second target position of the each second node comprises:

performing a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node.

13. The electronic device according to claim 12, wherein the processor is further configured to:

perform a second iteration in a direction from the first reference node towards the first node, wherein during the second iteration, the first reference node moves from the first updated position to the first original position, and a parent node in a path from the first reference node to the first node affects at least one of a displacement or a rotation of a child node; and determine the second target position of the first node and the second target position of the each second node according to a second updated position of the first node obtained by the second iteration.

14. The electronic device according to claim 13, wherein the processor is further configured to:

continue to perform the first iteration and the second iteration according to the second updated position of the first node obtained by the second iteration to obtain the second target position of the first node and the second target position of the each second node in response to iteration times of the first iteration and the second iteration meeting a preset condition.

15. The electronic device according to claim 13, wherein the processor is further configured to:

perform a third iteration in a direction from the first node towards a second reference node of the one or more second nodes to obtain a third updated position of the second reference node, wherein during the third iteration, the first node is located at the second updated position, and a parent node in a path from the first node to the second reference node affects at least one of a displacement or a rotation of a child node;

determine a fourth updating position of the second reference node according to the third updating position of the second reference node and a second original position of the second reference node before the collision occurs;

perform a fourth iteration in a direction from the second reference node towards the first node, wherein during the fourth iteration, the second reference node moves from the third updated position to the fourth updated position, and a child node in a path from the second reference node to the first node affects at least one of a displacement or a rotation of a parent node; and determine the second target position of the first node and the second target position of the each second node according to a fifth updated position of the first node obtained by the fourth iteration.

16. The electronic device according to claim 15, wherein the processor is further configured to:

continue to perform the first iteration, the second iteration, the third iteration and the fourth iteration according to the fifth updated position of the first node obtained by the fourth iteration; and obtain the second target position of the first node and the second target position of the each second node in response to the iteration times of the first iteration, the second iteration, the third iteration and the fourth iteration meeting a preset condition.

17. The electronic device according to claim 15, wherein the processor is further configured to:

determine a connection line between the third updated position and the second original position of the second reference node according to the third updated position of the second reference node and the second original position of the second reference node before the collision occurs; and select a point from the connection line as the fourth updated position of the second reference node.

18. A non-transitory computer-readable storage medium storing a computer program, wherein the computer program, when executed by a processor, implements a method for collision processing of a virtual object comprising:

in response to a collision occurring to the virtual object, determining a first node of the virtual object and one or more second nodes of the virtual object, the collision occurring to the first node, and each second node of the one or more second nodes being directly or indirectly connected with the first node;

determining a first target position of the first node according to a force applied to the first node during the collision;

determining a second target position of the first node and a second target position of the each second node according to the first target position, comprising: determining the second target position of the first node and the second target position of the each second node according to the first target position and a first original position of a first reference node in the one or more second nodes before the collision occurs, wherein the second target position of the first reference node is the first original position; and adjusting a posture of the virtual object in a user interface according to the second target position of the first node and the second target position of the each second node;

the determining the second target position of the first node and the second target position of the each second node comprises:

performing a first iteration in a direction from the first node towards the first reference node to obtain a first updated position of the first reference node, wherein during the first iteration, the first node moves to the first target position, and a child node in a path from the first node to the first reference node affects at least one of a displacement or a rotation of a parent node.

* * * * *